(12) United States Patent
Fujita et al.

(10) Patent No.: US 7,399,122 B2
(45) Date of Patent: Jul. 15, 2008

(54) SLIDING MEMBER

(75) Inventors: Masahito Fujita, Inuyama (JP); Hideo Tsuji, Inuyama (JP); Takayuki Shibayama, Inuyama (JP)

(73) Assignee: Daido Metal Company Ltd., Naka-Ku (JP)

( * ) Notice: Subject to any disclaimer, the term of this patent is extended or adjusted under 35 U.S.C. 154(b) by 779 days.

(21) Appl. No.: 10/837,639

(22) Filed: May 4, 2004

(65) Prior Publication Data

US 2004/0228554 A1 Nov. 18, 2004

(30) Foreign Application Priority Data

May 15, 2003 (JP) ............................. 2003-137229

(51) Int. Cl.
*F16C 17/00* (2006.01)
*F16C 33/00* (2006.01)

(52) U.S. Cl. ..................... 384/276; 384/283; 384/284

(58) Field of Classification Search .................. 384/283, 384/285, 291, 293, 276, 284, 286, 289
See application file for complete search history.

(56) References Cited

U.S. PATENT DOCUMENTS 3,386,783 A * 6/1968 Scheufler .................... 384/291
6,095,690 A * 8/2000 Niegel et al. ................ 384/293

FOREIGN PATENT DOCUMENTS

JP 6-200946 * 7/1994
JP 9-57424 * 3/1997

OTHER PUBLICATIONS

Sliding Bearing with Overlay Layer Quality-Improved, abstract, May 22, 2002, 1 page, Japan.

* cited by examiner

*Primary Examiner*—William C Joyce
(74) *Attorney, Agent, or Firm*—Browdy and Neimark

(57) ABSTRACT

In order to improve conformability of a sliding surface of a sliding member in an early state of sliding, there is provided a sliding member in which a plurality of holes are formed on a sliding surface, and the diameters (or the opening area) of the holes on the sliding surface are arranged so as to become gradually large as it gets closer to both ends in an axial direction from the center side in the axial direction. This feature decreases the pressurized area as it gets closer to the ends of the sliding surface so that it wears at an early stage, whereby a conformed surface following the deflection of a mating member is provided.

12 Claims, 7 Drawing Sheets

SLIDING MEMBER

BACKGROUND OF THE INVENTION

The present invention relates to a sliding member in which a high load acts on an end side of a sliding surface thereof, and particularly to a sliding member for a main bearing for supporting a crankshaft of an engine, for example.

In general, an engine used for an automobile or the like is constructed so that a crankshaft and a piston are mutually coupled via a connecting rod. This engine generates driving force by using the connecting rod to convert up-and-down movement (vertical movement) of the piston into rotational movement and to transmit it to the crankshaft. Because the crankshaft obtains the rotational movement by converting the up-and-down movement as described above, a main shaft thereof is rotated in a so-called elliptical orbit, that is, in a deflected state in an radial direction if using a grandiloquent phrase.

However, if the crankshaft is deflected during sliding operation before the main bearing supporting it conforms to the crankshaft, that is, in an initial state immediately after newly bringing it into use, a load acts particularly on both end portions in an axial direction of the main bearing. Therefore, the bearing surface load sometimes rises extremely in the portions to cause breakage of an oil film and accordingly, the sliding operation in a partial metallic contact state has caused seizure or the like. For preventing this seizure, it is necessary to improve conformability in the initial state, and in particular, to improve the initial conformability on an end side of the sliding surface in the axial direction.

There is known a sliding member which is improved in anti-seizure property by covering a bearing alloy layer with an overlay layer, by directly spraying hard particles of the mean particle diameter of 20 to 100 μm on the overlay layer to form fine recesses having a crater shape on the overlay layer working as a sliding surface, and by confining lubrication oil to the recesses, for example. See JP-A-2002-147459 (Paragraph "0010" to "0034,", and Table 4), for example.

BRIEF SUMMARY OF THE INVENTION

In general, reviewing oil film pressure distribution in a cross section in an axial direction of the sliding surface in a steady state appearing after the sliding surface conforms to a mating member for example, the pressure is high at the center of the axial direction of the sliding surface, and gradually decreases toward both ends of the axial direction, as shown by a solid line L2 in FIG. 10 (which shows the oil film pressure in an initial sliding state by a dashed line L1, the oil film pressure in the steady sliding state by the solid line L2, and the axial direction by an arrow A). However, reviewing the oil film pressure distribution in the initial state in which the sliding surface has not sufficiently conformed to the mating member, the pressures at both ends of the axial direction are higher than that at the center of the axial direction, as shown by the line L1 in FIG. 10.

Thus, in the case of the sliding member improved in the anti-seizure property by confining the lubrication oil in the crater-shaped recesses to thicken the oil film as disclosed in JP-A-2002-147459, if the mating member unevenly contacts both ends of the sliding surface in the axial direction, a high load is applied thereto so that the oil film pressure becomes high at both ends in the axial direction after all and accordingly, the oil film thickness becomes thinner to eventually cause the seizure or the like due to the partial metallic contact.

The present invention has been made in view of the above-described circumstances, and an object thereof is to provide a sliding member capable of reducing the oil film pressure at both ends in the axial direction in the initial sliding state, and preventing occurrence of the oil film destruction and accordingly the seizure or the like due to the partial metallic contact as much as possible.

According to a first aspect of the invention, there is provided a sliding member for supporting a shaft comprising a sliding surface, and a plurality of recesses provided in an end portion in an axial direction on the sliding surface, wherein the recesses are arranged in the end portion so that the total opening area per unit area gradually increases from the center side toward the end side in the axial direction of the sliding surface. Here, the end portion in which the recesses are formed on the sliding surface corresponds to a region which is appropriately adjusted in accordance with a deflection manner of a mating member and thus may not necessarily occupy a certain ratio with respect to a total width of the sliding surface. The distances between the recesses on the sliding surface may be made at the same pitch or different pitches in accordance with the opening area of the recess, the distribution density of the recesses, the width of the sliding surface, and the like. A hole, groove, or the like may be used as a recess.

According to the first aspect, the recesses are formed on the sliding surface so that the total area of openings of the recesses per unit area becomes gradually larger as it gets closer to the end side. For this reason, the lubrication oil is stored in the recesses in the initial sliding state, the pressurized area decreases in the end portion of the sliding surface due to the recesses, and the strength of the sliding member is adequately reduced, whereby the sliding surface wears in conformity with the deflection of the mating member. At this time, in the case where the lubrication oil is not sufficiently supplied from a lubricant pump on startup of an engine or the like, the lubrication oil in the recesses on the sliding surface is supplied between the sliding surfaces to prevent the seizure as much as possible. Accordingly, the sliding surface is worn at an early stage, while the lubrication oil prevents the seizure, so as to form a conformed surface in the initial sliding state.

According to a second aspect of the invention, the recess may be a hole or a groove having a sectional form which is tapered off toward a bottom. Here, the hole of which sectional form is tapered off toward the bottom is a so-called bowl-shaped hole or conical hole, irrespective of a tapering degree.

According to the second aspect, the opening area decreases as wear of the sliding surface progresses, and the pressurized area increases in reverse proportion thereto so that the bearing surface pressure acceptable by the sliding surface is increased. For this reason, fast progress of the wear at the early stage is stopped by the formation of the conformed surface while the holes remain without being entirely whittled or ceasing to exist, so that the lubrication oil can be stored in the remaining holes in the initial sliding state, the seizure can be prevented.

According to a third aspect of the invention, the recess may be a hole, and the mean diameters of the holes become larger as it gets closer to the end side of the sliding surface. Here, the mean diameter refers to a diameter which is obtained by dividing the total of the opening areas of the holes (total opening area) by the total number of the holes to calculate the opening area of each hole. Also, in the case where the opening area is noncircular, the diameter is calculated by using an area of a perfect circle obtained by converting the opening area into the perfect circle.

According to the third aspect, the mean diameters of the respective holes on the sliding surface are formed so as to be gradually larger, so that the pressurized area at the end of the sliding surface is smaller than the pressurized area other than that at the end, and so the wear of the sliding surface is further promoted to form the conformed surface earlier.

According to a fourth aspect of the invention, the recess may be a hole, which has the mean diameter of 1 to 100 μm. This is because good lubrication is achieved in the case that the size of a soft lubrication metal used in a conventional bearing alloy layer is in this range. The present invention artificially provides such distribution of natural lubrication particles in a more adequate range.

According to the fourth aspect, the oil film pressure is not extremely raised for the reason that oil retaining property of the holes is deteriorated due to the holes formed on the sliding surface being too small, and that the pressurized area is decreased due to the holes being too large.

According to a fifth aspect of the invention, the recess may be a hole or a groove wherein the depths of the holes or the grooves are made gradually deeper as it gets closer to the end side of the sliding surface. Here, the depth refers to a length (depth) from an opening surface of the hole or groove to the lowest surface thereof.

According to the fifth aspect, the holes or the grooves become deeper as it gets closer to the end side of the sliding surface at which the wear is inevitably promoted most significantly by the sliding with the mating member. Therefore, all the holes and grooves will not cease to exist even if the end of the sliding surface fiercely wears by the sliding with the mating member.

According to a sixth aspect of the invention, the recess may be a hole or a groove having the depth of 1 to 100 μm.

According to the sixth aspect, the depth of the hole or the groove formed on the sliding surface is not too shallow, and so all the holes and grooves will not cease to exist even if the sliding surface wears by a certain amount in the initial sliding state. Therefore, the oil retaining property of the holes or the grooves will be kept without being extremely reduced. Furthermore, the hole and groove are not too deep to reduce the strength of the sliding member more than necessary.

According to a seventh aspect of the invention, the recess formed on the sliding surface may be a hole or a groove, and solid lubricant is accommodated in one or more of the holes or the grooves. Here, the solid lubricant refers to lead, tin, bismuth, molybdenum disulfide, graphite, tungsten disulfide, PTFE or the like, and one or more kinds of solid lubricant selected therefrom are accommodated in the holes or the grooves. This solid lubricant may be filled in whole volume (capacity) of the holes or the grooves, or a part of the inside volume thereof. Also, the holes having the solid lubricant accommodated inside and the holes having no solid lubricant accommodated inside may not be formed by being mutually limited to specific placements on the sliding surface. In the case where the recess is the groove, the solid lubricant may be accommodated in all or an arbitrary part of the groove.

According to the seventh aspect, the holes or the grooves having the solid lubricant accommodated inside are dispersed on the sliding surface. For this reason, there exists on the sliding surface the solid lubricant to be an alternative for the lubrication oil when there is little or no lubrication oil during the sliding with the mating member. Therefore, it prevents the mating member and the sliding member from sliding in the partial metallic contact state either in the sliding at the early stage or the sliding after running-in. Also, it is possible for the holes or the grooves having no solid lubricant accommodated inside to hold the lubrication oil therein alternatively, so as to supply the lubrication oil between the sliding surfaces from the end of the opening, which is effective on the sliding after the running-in.

Other objects, features and advantages of the invention will become apparent from the following description of the embodiments of the invention taken in conjunction with the accompanying drawings.

DETAILED DESCRIPTION OF THE INVENTION

Hereafter, a description will be given by using FIGS. 1 to 6 with respect to a first embodiment in which a sliding member of the present invention is applied to a main bearing supporting a crankshaft of an engine.

Figure 2:
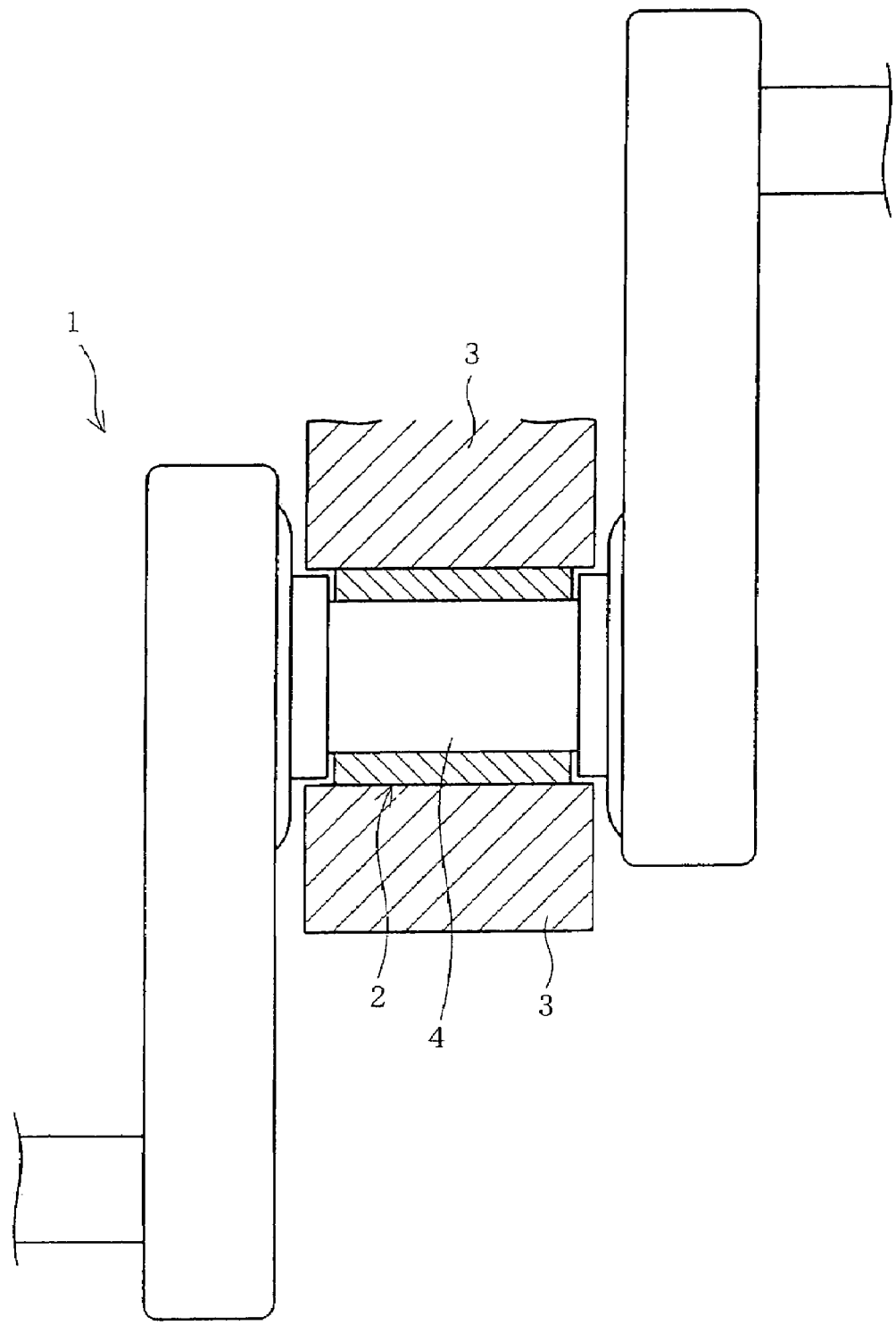
FIG. 2 shows a relationship between a crankshaft and a main bearing.
Figure 3:
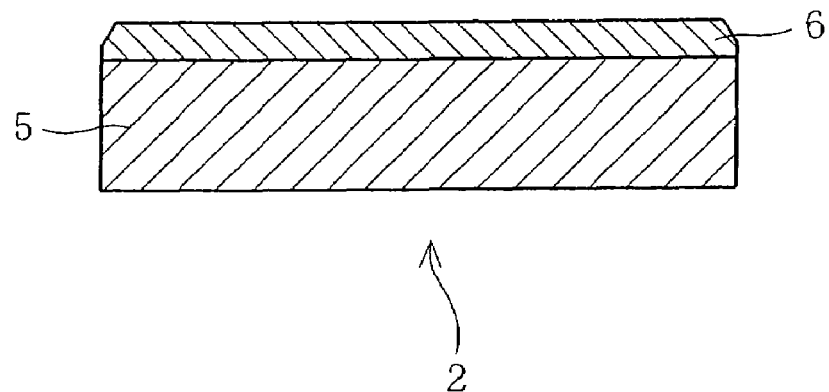
FIG. 3 is a sectional view of the sliding member.
Figure 6A:
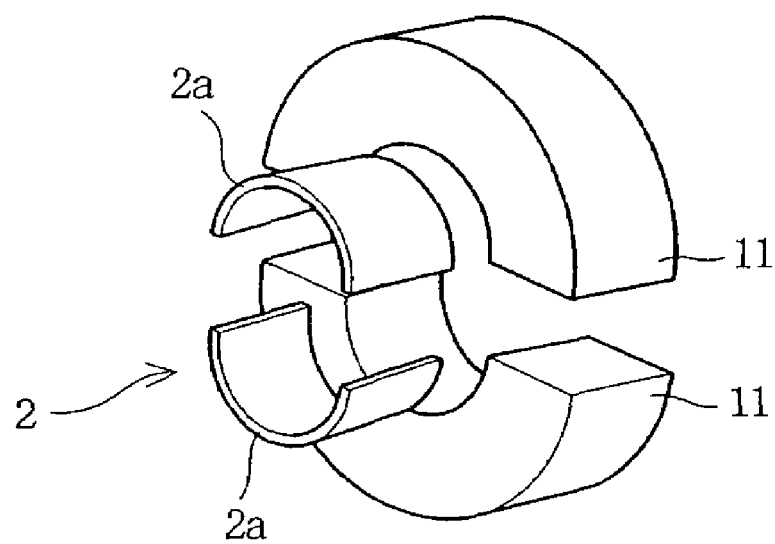
FIG. 6A is a perspective view showing a relationship between a jig and bearing halves.
Figure 6B:
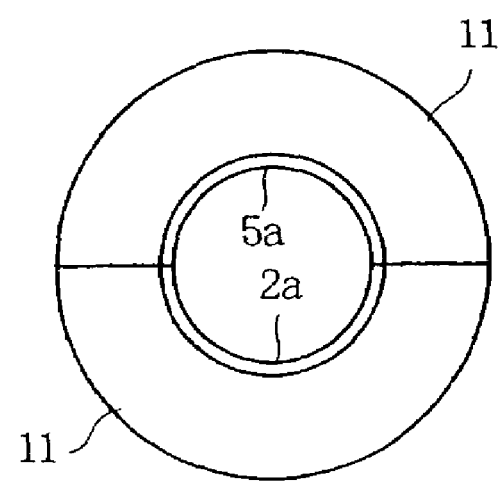
FIG. 6B is a front view showing the relationship between the jig and the bearing halves.

As shown in FIG. 2, a main bearing 2 which is a sliding member for supporting a crankshaft 1 has its outer circumferential surface fitted with a housing 3, and rotatably supports a main shaft 4 (a mating member) of the crankshaft 1 on its inner circumferential surface. As shown in FIGS. 6A and 6B, the main bearing 2 is cylindrically formed by putting two bearing halves 2a of a semi-cylinder shape together. The bearing halves 2a are constituted by placing a copper bearing alloy layer 6 on a steel back metal 5 as shown in FIG. 3 showing its cross section. Also, the bearing alloy layer 6 may be made of aluminum, and may be covered with an overlay layer.

Figure 1:
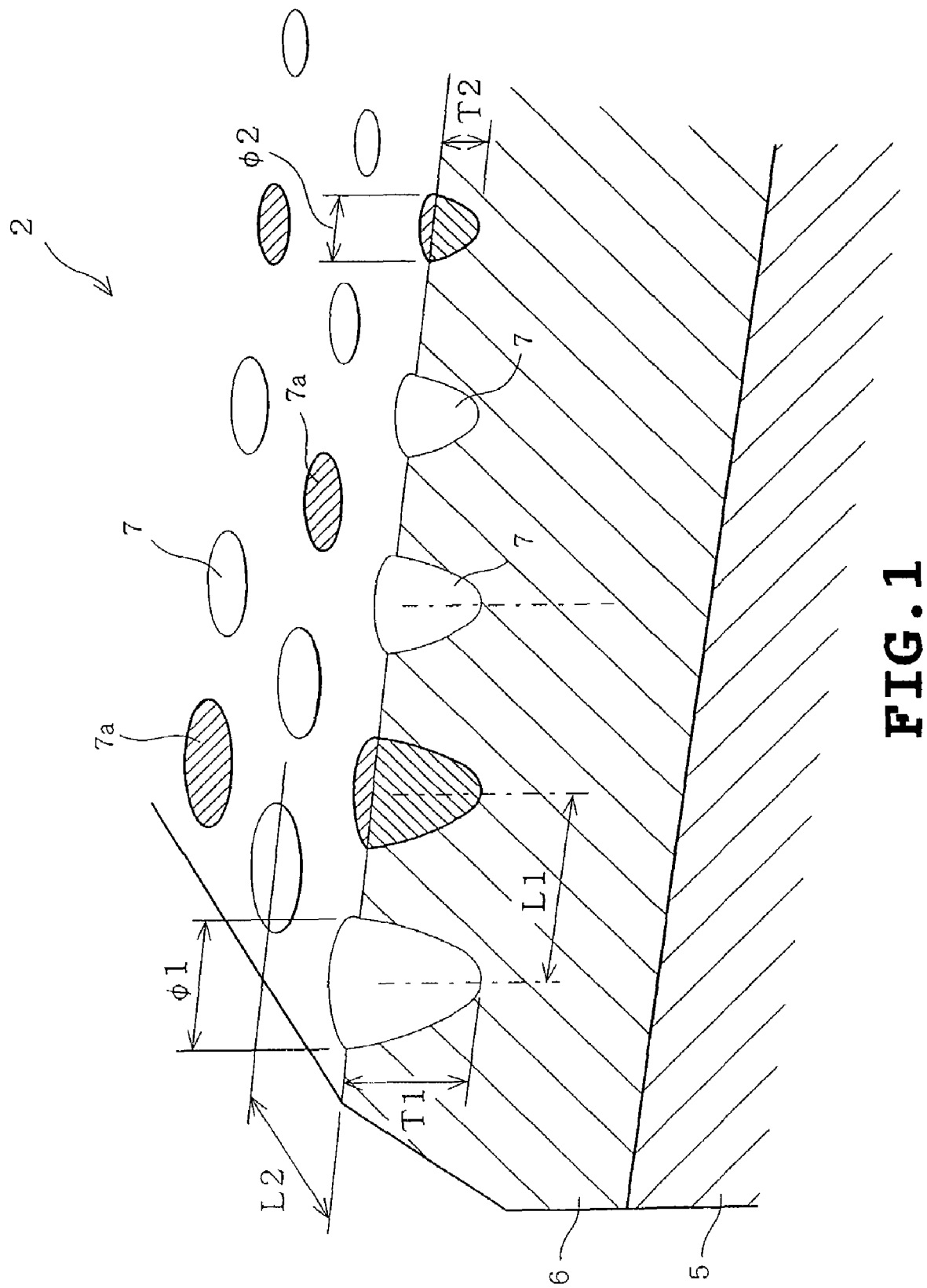
FIG. 1 is a perspective sectional view of an end portion in an axial direction on a sliding surface of a sliding member, which shows a first embodiment of the present invention.
Figure 4:
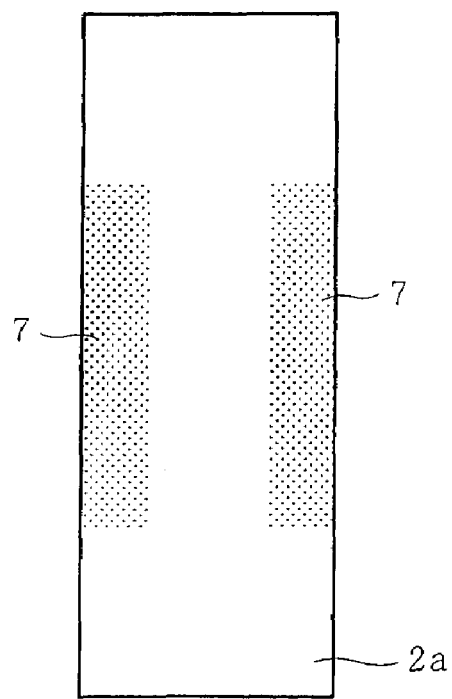
FIG. 4 is a plan view showing a formation region of holes on the sliding surface of the sliding member.

As shown in FIG. 1, there are provided holes 7 as recesses in both end portions in an axial direction of a sliding surface, on which the main shaft 4 slides, of the bearing halves 2a in a vertically and horizontally aligned state. The holes 7 are constituted so that the opening diameters (opening areas) on the sliding surface become larger and the depths thereof become deeper as those get closer to both ends in the axial direction from the center side in the axial direction. Sectional shapes of the holes 7 which are independent from each other are a so-called bowl-shape, and the sectional shapes on an arbitrary plane parallel with the sliding surface in a depth direction of the holes 7 are an approximately circular shape. It should be noted that FIG. 1 exaggeratedly shows the depths of the holes. For this reason, the shapes thereof are different from those of actual holes precisely. According to this embodiment, as shown in FIG. 4 showing the bearing halves 2a in a developed form, the holes 7 are formed at both end portions in the axial direction and at the center in a circumferential direction (screened portions respectively). These portions are subjected to a specifically high load due to deflection of the main shaft 4.

In concretely describing dimensions of the holes 7, all the diameters on the sliding surface are in a range of 1 to 100 µm. For instance, a diameter ø2 of the hole 7 existing at a centermost location in the axial direction is 1 to 5 µm or so, and the holes 7 are arranged so that the diameters thereof become gradually large toward both end portions in the axial direction, whereby a diameter ø1 of the hole 7 existing at an endmost location at both end portions in the axial direction is 90 to 100 µm. Thus, the opening area of the holes 7 per unit area becomes gradually large toward the end of the sliding surface.

Thus, pressurized area decreases toward both end portions in the axial direction and thus wear is apt to progress rapidly, until the pressurized area at both end portions in the axial direction is increased appropriately. Therefore, initial conformability at both ends in the axial direction on the sliding surface is improved.

The depths of all the holes 7 on the sliding surface are in the range of 1 to 100 µm. For instance, a depth T2 of the hole 7 existing at the centermost location in the axial direction is 1 to 5 µm or so, and the depths become gradually deep toward both ends in the axial direction so that a depth T1 of the hole 7 existing at the endmost location at both ends of the axial direction is 90 to 100 µm.

The holes 7 are arranged so that the depths thereof are shallower at the center of the axial direction, and the depths become gradually deep toward both ends in the axial direction so as to be eventually 100 µm or so. The holes are in a so-called bowl-shape tapering off toward the bottom, so that the diameters thereof become small in accordance with the wear of both end portions in the axial direction on the sliding surface, and inversely, the pressurized area is gradually increased, whereby it becomes possible to withstand a high load to curb the progress of the wear at the early stage within a certain amount. The holes 7 at both end portions in the axial direction on the sliding surface wear and become shallow due to the sliding with the mating member at the early stage. However, they are not entirely whittled and cease to exist and thus the oil storage amount of the holes 7 is secured at a certain amount, and oil maintainability of the holes 7 is sustained. The holes shallower than the above described range cannot obtain a sufficient oil storage amount, and the oil maintainability thereof is apt to be inferior. In the case of the holes deeper beyond the range, a load carrying capacity is reduced so that fatigue is apt to occur from a surrounding area of the holes.

The mutual distance between the holes 7 on the sliding surface should be measured with reference to the centers of the holes 7 on the sliding surface, respectively. For instance, the mutual distance should desirably be about 100 µm at the center in the axial direction on the sliding surface, that is, in the case of the holes 7 of small diameters, and about 150 to 200 µm in both ends in the axial direction, that is, in the case of the holes 7 of large diameters. The mutual distance between the holes 7 is appropriately adjusted based on the diameters of the holes on the sliding surface, distribution density of the holes, stepwise enlargement (extension) of the diameters of the holes from the center to both ends in the axial direction, or the like. As a matter of course, the principle that the opening area of the holes 7 per unit area becomes larger as it gets closer to the ends in the axial direction should not be undermined.

Figure 5:
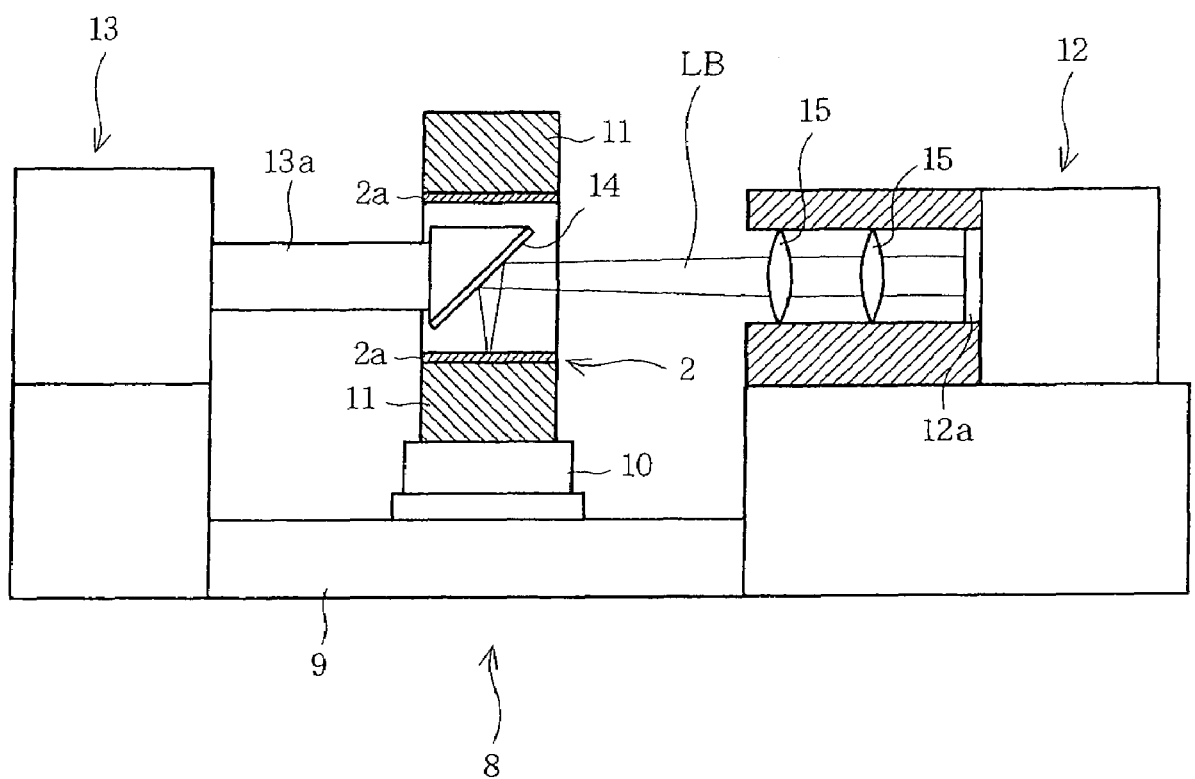
FIG. 5 is a sectional view showing a hole forming apparatus.

Next, a method of forming the holes 7 on the main bearing 2 will be described. FIG. 5 shows a hole forming apparatus 8, wherein a slider 10 capable of moving linearly by means of an unshown servo motor is placed on a bed 9 thereof. Jigs 11 for holding the main bearing 2 are rotatably mounted on the slider 10. The jigs 11 are in a half cylindrical shape as shown in FIGS. 6A and 6B, and are rotationally driven by the unshown servo motor.

A laser transmitter 12 and a mirror bracket 13 are provided on both sides of the bed 9. A mirror 14 is mounted on the mirror bracket 13 via an arm 13a to face an askew downside, so that, if the slider 10 moves leftward in the drawing, the mirror 14 goes into the main bearing 2 mounted on the jigs 11. The laser transmitter 12 is comprised of a YAG laser and so on, and a laser beam LB is radiated to the mirror 14 from a radiation port 12a so as to be reflected on the mirror 14 and irradiated on the sliding surface of the main bearing 2 mounted on the jigs 11.

Two condenser lenses 15 are provided, for instance, in front of the radiation port 12a of the laser transmitter 12, and the laser beam LB radiated from the radiation port 12a is focused by the condenser lenses 15.

To form the holes 7 on the sliding surface of the main bearing 2 using the hole forming apparatus 8, firstly, two bearing halves 2a are mounted on the jigs 11 in a combined state as shown in FIGS. 6A and 6B. Then, if the laser beam LB is radiated from the laser transmitter 12, the laser beam LB is focused by the condenser lenses 15, and is reflected by the mirror 14 so as to be irradiated on the sliding surface of the main bearing 2 to form the holes 7.

Here, the laser beam LB is intermittently radiated from the laser transmitter 12, and its power density is $10^6$ to $10^7$ W/cm$^2$, and its pulse width is $10^{-6}$ to $10^{-3}$ sec, for example. The portion on which the laser beam LB is irradiated instantaneously evaporates if the power density and the pulse width are within the above described limits. If the power density and the pulse width exceed the above described limits, it becomes impossible to form an adequate hole.

Once the holes 7 are formed as described above, the slider 10 is moved by one pitch to form the next holes 7. After forming a series of holes 7 in a width direction of the main bearing 2, the jigs 11 are rotated by one pitch so as to form next series of holes 7. Thus, the holes 7 are formed in a vertically and horizontally aligned state on the sliding surface by the movement of the slider 10 and the rotation of the jigs 11. Also, the forming steps of the holes 7 may be alternated with respect to the width direction and the circumferential direction on the sliding surface.

In at least one of the holes 7 as formed in the above manner, solid lubricant 7a is accommodated. According to this embodiment, the holes 7 having the solid lubricant 7a accommodated therein and the holes 7 having no solid lubricant are irregularly placed as shown in FIG. 1. There are the following three methods of accommodating the solid lubricant 7a in the holes 7.

Method 1: In the case of accommodating any one of lead, tin, bismuth, molybdenum disulfide, graphite, tungsten disulfide and PTFE, first, the solid lubricant is rendered as fine powder (of which diameter=5 µm or less), and then turned into paste with an engine oil as a binder. Next, this pasty solid lubricant is accommodated inside the holes 7 by applying it to the sliding surface of the sliding member heated to 100 to 150° C.

Method 2: In the case of accommodating any one of lead, tin, bismuth, molybdenum disulfide, graphite, tungsten disulfide and PTFE, firstly, the solid lubricant is rendered as fine powder (of which diameter=5 μm or less), and then turned into the paste state by using thermosetting resin or thermoplastic resin as a binder, as well as an organic solvent. Next, this pasty solid lubricant is accommodated inside the holes 7 by applying it to the sliding surface of the sliding member heated to 100 to 150° C.

Method 3: In the case of accommodating any one of metallic solid lubricants such as lead, tin and bismuth, firstly, the plating is performed on the sliding surface of the sliding member using the metallic solid lubricant. Next, the plated sliding surface is finished so as to accommodate (leave) the lubricant only in the holes 7 by removing the plating other than that in the holes 7 (or on the sliding surface).

Next, the effect according to this embodiment will be described.

In a driving state of the engine, lubrication oil pumped from a lubricant pump (not shown) is supplied between the sliding surfaces of a main shaft 4 of the crankshaft 1 and the main bearing 2, whereby the lubrication between the sliding surfaces is implemented. Here, the crankshaft 1 rotates while receiving explosion power of combustion downward at both ends thereof, so that the crankshaft 1 rotates in an elliptical orbit in a state of deflecting in a circular arc shape in a radial direction, if exaggeratedly expressed. For this reason, when in the initial state of the sliding together with the main bearing 2, the main shaft 4 unevenly contacts in both end portions by necessity, so that the bearing surface load gradually rises at both ends in the axial direction on the sliding surface.

According to the first embodiment, however, the holes 7 are provided from the center in the axial direction to both ends in the axial direction on the sliding surface. The holes 7 are formed so that the diameters thereof become larger and the depths thereof become deeper on the sliding surface, that is, the volume thereof becomes larger as the holes get closer to both ends in the axial direction. For this reason, the closer to both ends in the axial direction on the sliding surface the portion is, the less the pressurized area becomes, so that the wear is apt to progress rapidly in the portion close to the end even if the sliding is carried out in an uneven contact state at the early stage of the sliding. Therefore, the portion wears at the early stage, and the conformed surface having a circular arc surface shape following the deflection of the main shaft 4 is formed so that a surface load (bearing surface load) of the sliding surface is leveled over the whole surface and thus, seizure and the like do not occur.

Among the holes 7 on the sliding surface, there are the holes 7 in which the solid lubricant 7a is accommodated, so that it is prevented that the mating member and the sliding member slide in the partial metallic contact state either in the sliding at the early stage or in the sliding after running-in. Further, since there are the holes 7 of which inside is a cavity for holding the lubrication oil in addition to the holes 7 in which the solid lubricant 7a is accommodated, the oil maintainability of the sliding surface is maintained. As such, since both holes 7 is formed in a mixed state, the sliding with no lubrication is satisfied.

The internal shapes of the holes 7 are formed in a so-called bowl-shape tapering off toward the bottom. For this reason, if the sliding surface wears, the pressurized area increases in accordance with decrease of the opening area of the holes. Therefore, as the sliding surface wears, an effect as the conformed surface is exerted at the early stage of the sliding, and the rapid progress of the wear at both ends of the sliding surface is stopped due to increase of the pressurized area. Further, because the rapid progress of the wear is stopped in such a manner, it is possible to prevent the holes 7 from being whittled entirely and ceasing to exist, so that the oil maintainability of the sliding surface is securely maintained. Thus, the seizure is prevented even in the steady state after the running-in.

Some tests for verifying the effects of this embodiment were conducted. The verification tests include a seizure test for measuring a bearing back side temperature and so on, and a fatigue test for measuring the maximum surface load in which the fatigue does not occur. There are used test pieces in which an aluminum or copper bearing alloy layer 6 is firmly fixed to a steel back metal 5 for conventional pieces 1 and 2, and pieces 1 to 18 of the invention as shown in the following table 1, respectively. The aluminum bearing alloy layer contains 10 mass % of Sn, 3 mass % of Si, and Al for the rest. The copper bearing alloy layer contains 6 mass % of Sn, 3 mass % of Ni, and Cu for the rest.

Among the pieces as the embodiments of the present invention, the holes 7 of the sliding surfaces of the pieces 2, 3, 5, 6, 8, 9, 11, 12, 14, 15, 17 and 18 include the solid lubricant 7a accommodated therein (accommodated in about 40% of the total opening area, that is, so-called gross opening area in each hole 7 of the sliding surface), and $MoS_2$ (molybdenum disulfide) and Gr (graphite) are used for the solid lubricant 7a. The conventional pieces 1 and 2 are the pieces wherein glass beads of 50 μm mean particle diameter are directly sprayed on the surface of the bearing alloy layer to perform a shot blast process so as to form crater-shaped recesses of maximum 5 μm depth (mean distance between the recesses: 0.04 mm). Test conditions are described in Tables 2 and 3.

TABLE 1

|  | No | Surface Conditions | | | | | *Brg Alloy | Seizure Load | Fatigue Load |
|---|---|---|---|---|---|---|---|---|---|
| Conventional | 1 | Shot Blast Material | | | | | (1) | 90 MPa | 110 MPa |
|  | 2 | Shot Blast Material | | | | | (2) | 85 MPa | 120 MPa |
|  |  | L1 μm | L2 μm | Ø1/T1 μm | Ø2/T2 μm | Solid Lub. | | | |
| Invention | 1 | 100 | 100 | 80/15 | 30/10 | — | (1) | 100 MPa | 120 MPa |
|  | 2 | 100 | 100 | 80/15 | 30/10 | $MoS_2$ | (1) | 120 MPa | 130 MPa |
|  | 3 | 100 | 100 | 80/15 | 30/10 | Gr | (1) | 125 MPa | 130 MPa |
|  | 4 | 100 | 100 | 80/15 | 30/10 | — | (2) | 95 MPa | 125 MPa |
|  | 5 | 100 | 100 | 80/15 | 30/10 | $MoS_2$ | (2) | 110 MPa | 130 MPa |
|  | 6 | 100 | 100 | 80/15 | 30/10 | Gr | (2) | 120 MPa | 130 MPa |

TABLE 1-continued

| No | | Surface Conditions | | | | *Brg Alloy | Seizure Load | Fatigue Load |
|---|---|---|---|---|---|---|---|---|
| 7 | 200 | 200 | 80/15 | 30/10 | — | (1) | 105 MPa | 125 MPa |
| 8 | 200 | 200 | 80/15 | 30/10 | MoS₂ | (1) | 120 MPa | 130 MPa |
| 9 | 200 | 200 | 80/15 | 30/10 | Gr | (1) | 120 MPa | 130 MPa |
| 10 | 200 | 200 | 80/15 | 30/10 | — | (2) | 100 MPa | 125 MPa |
| 11 | 200 | 200 | 80/15 | 30/10 | MoS₂ | (2) | 110 MPa | 135 MPa |
| 12 | 200 | 200 | 80/15 | 30/10 | Gr | (2) | 115 MPa | 135 MPa |
| 13 | 150 | 150 | 50/10 | 20/5 | — | (1) | 110 MPa | 130 MPa |
| 14 | 150 | 150 | 50/10 | 20/5 | MoS₂ | (1) | 125 MPa | 135 MPa |
| 15 | 150 | 150 | 50/10 | 20/5 | Gr | (1) | 120 MPa | 135 MPa |
| 16 | 150 | 150 | 50/10 | 20/5 | — | (2) | 110 MPa | 125 MPa |
| 17 | 150 | 150 | 50/10 | 20/5 | MoS₂ | (2) | 120 MPa | 135 MPa |
| 18 | 150 | 150 | 50/10 | 20/5 | Gr | (2) | 120 MPa | 135 MPa |

*Material of Bearing Alloy Layer
(1) Al—10Sn—3Si
(2) Cu—6Sn—3Ni

TABLE 2

Seizure Test: Test Condition

| | |
|---|---|
| Revolution Speed | 7200 rpm |
| Circumferential Speed | 20 m/s |
| Test Load | Adding 10 MPa per 10 minutes |
| Lubrication Oil Temperature | 100° C. |
| Oil Feeding Amount | 150 ml/min |
| Lubrication Oil | VG22 |
| Shaft Material | S55C |
| Evaluation Method | It is defined that the seizure occurs when the bearing backside temperature exceeds 200° C., or a shaft driving belt slips due to torque fluctuation. |

TABLE 3

Seizure Test: Test Condition

| | |
|---|---|
| Revolution Speed | 3250 rpm |
| Circumferential Speed | 9.0 m/s |
| Test Time | 20 Hrs |
| Lubrication Oil Temperature | 100° C. |
| Lubrication Oil Pressure | 0.49 MPa |
| Lubrication Oil | VG68 |
| Shaft Material | S55C |
| Evaluation Method | Maximum surface load in which the fatigue is not generated. |

Reviewing the test results, good results as to both the seizure load and fatigue load were yielded generally in the case of the pieces of the inventions 1 to 18 in which the opening area is larger and the holes 7 are deeper as getting closer to both ends in the axial direction from the center in the axial direction, that is, the holes 7 having larger capacity are formed. In particular, good results were yielded in the seizure test compared to the comparative pieces, and the solid lubricant 7a was effective in both the seizure test and fatigue test.

As opposes to this, since the conventional pieces 1 and 2 have just concave and convex portions formed by the shot blast all over the sliding surfaces, both the seizure test and fatigue test results are inferior even if the material of the bearing alloy layer 6 is Al-based, or Cu-based.

Figure 7:
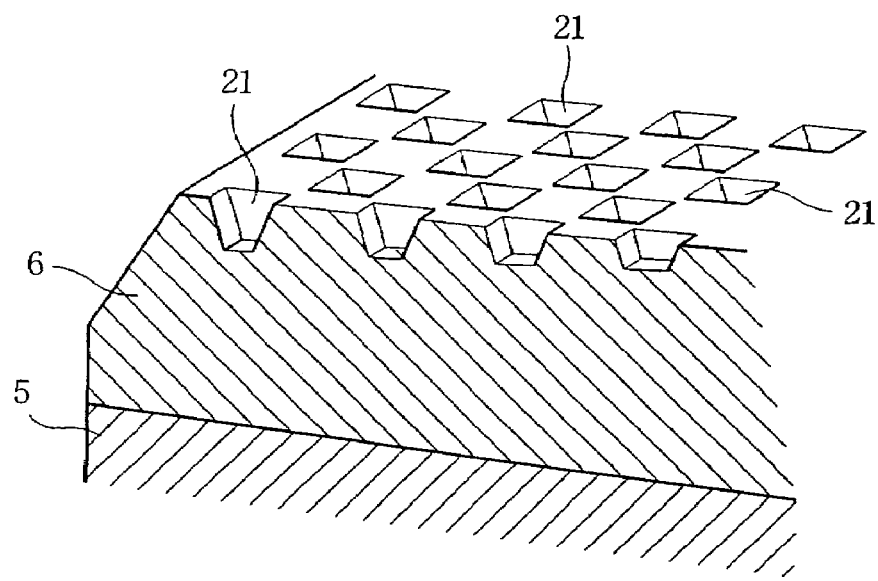
FIG. 7 shows a second embodiment of the present invention, and corresponds to FIG. 1.

In the above first embodiment, the cross section of the hole 7 on the sliding surface is bowl-shaped. However, it is not limited thereto, but a hole 21 having a square-shape, that is, a so-called inverted trapezoid shape or the like may be formed as shown in FIG. 7 showing a second embodiment of the present invention, for instance.

Further, the diameters and depths of the holes 7 and 21 on the sliding surfaces is made wider and deeper as getting closer to both ends in the axial direction from the center in the axial direction. However, it is not limited thereto, and the sectional shape and internal shape of all the holes 7 and 21 may be the same, for instance. In that case, it is desirable to narrow the distance between the holes 7 or the holes 21 as getting closer to both ends in the axial direction from the center in the axial direction.

Further, as to the holes 7 formed on the sliding surfaces, the holes 7 having the solid lubricant 7a accommodated therein and the holes 7 of which inside forms a cavity are irregularly placed. However, it is not limited thereto, and both the holes 7 may be regularly placed, for instance.

Further, a plurality of holes 7 and 21 are formed by aligning those vertically and horizontally on the sliding surfaces. However, it is not limited thereto, and the holes 7 and 21 may be formed irregularly in an unaligned state, for instance.

According to the first and second embodiments, the holes 7 and 21 are formed at both ends of the sliding surfaces and the center of the circumferential direction (see FIG. 4). However, it is not limited thereto, and the holes 7 and 21 may be formed all over the sliding surfaces in the case where a varying load or uneven contact occurs all over the sliding surfaces.

Figure 8:
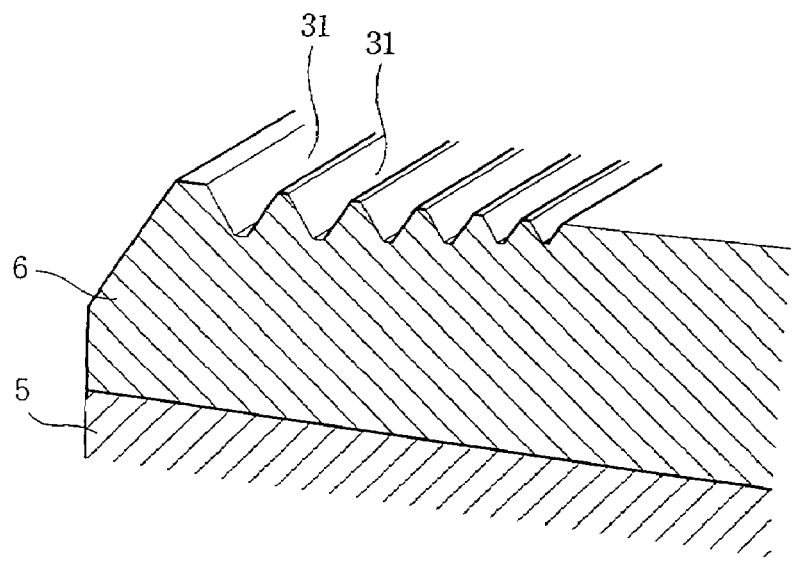
FIG. 8 shows a third embodiment of the present invention, and corresponds to FIG. 1.
Figure 9:
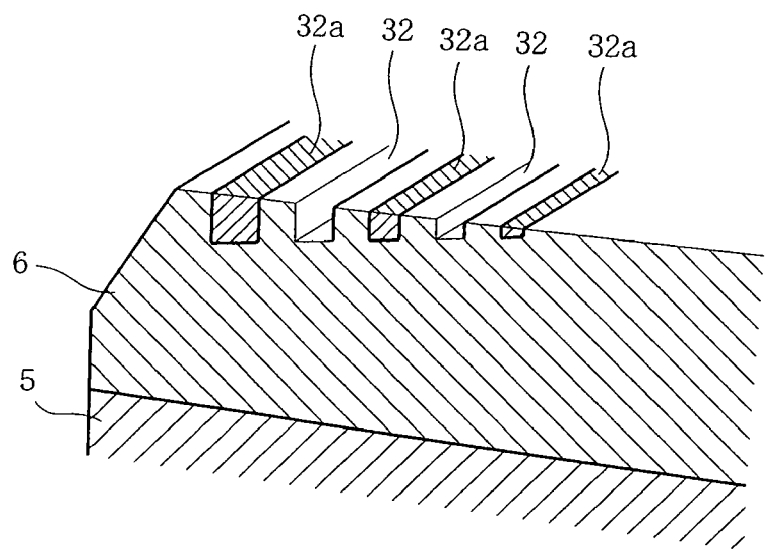
FIG. 9 shows a fourth embodiment of the present invention, and corresponds to FIG. 1.
Figure 10:
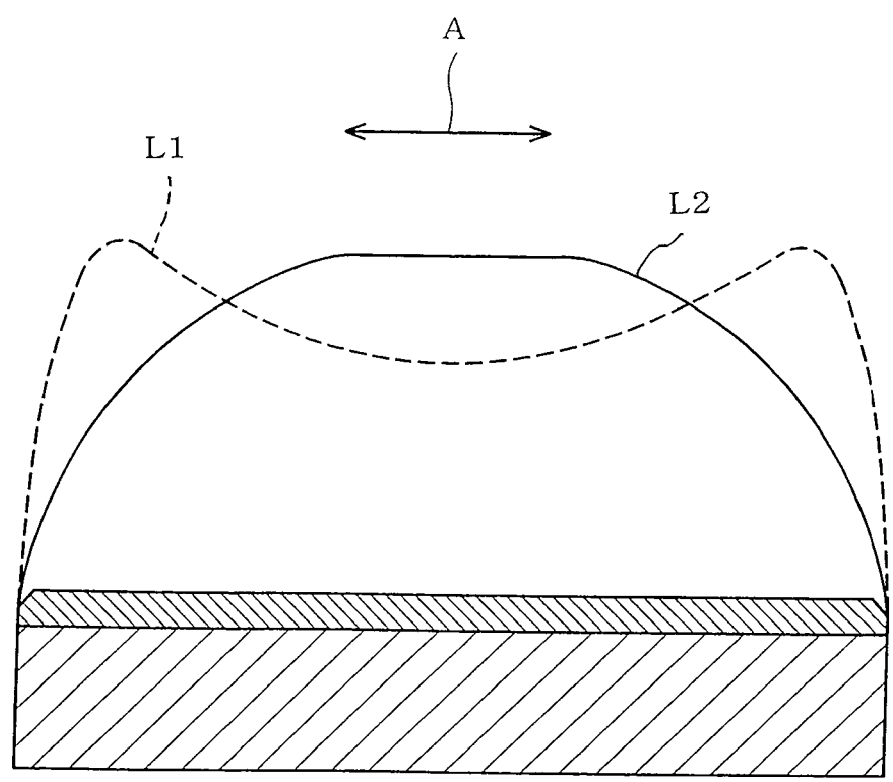
FIG. 10 is a diagram showing oil film pressure distribution on the sliding surface.

Further, it is not always necessary to form the holes 7 and 21 on the sliding surfaces, but it is also possible, for instance, to form, as a recess, a groove 31 of which cross section is an inverted triangle extending in the circumferential direction as shown in FIG. 8 showing a third embodiment of the present invention, or form a groove 32 of which cross section is square and which accommodates therein a solid lubricant 32a in the entirety of a part of the grooves as shown in FIG. 9 showing a fourth embodiment of the present invention. The area in which the grooves 31 and 32 are formed is configured so that the opening area becomes gradually large at the ends of the sliding surfaces of the grooves 31 and 32, for example, the grooves 31 and 32 are made wide toward the ends of the sliding surfaces, or the mutual distance between the grooves 31 and 32 is made narrow to increase the opening area per unit area on the sliding surface.

By forming such grooves 31 and 32 by means of a grooving process using a turning tool or the like for instance, the formation method thereof is simplified. The solid lubricant 32a is accommodated by using one of the methods described in the first embodiment.

According to the third and fourth embodiments, the grooves 31, 32 and the solid lubricant 32*a* are formed on the entire circumference in the circumferential direction on the sliding surface so that good sliding can be performed. The grooves 31 and 32 may not be formed on the entire circumference on the sliding surface, but may be formed on a part of the sliding surface which is expected to be loaded in particular.

According to the first to fourth embodiments, the sliding member is applied to the main bearing 2. However, it is not limited thereto, and it may also be applied to a piston pin bearing, and may be applied further to the sliding members of a high-revolution speed engine, a heavy machinery and the like the rotation in the elliptical orbit in the crankshaft and the like is expected.

Also, it should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A sliding member for supporting a shaft comprising:
   a sliding surface; and
   a plurality of recesses provided in an end portion in an axial direction in the sliding surface, wherein
   the recesses are arranged in said end portion so that the total opening area per unit area gradually increases from the center side toward the end side in the axial direction of the sliding surface,
   wherein the recess comprises a hole or a groove having a sectional form which is tapered off toward the bottom thereof.

2. A sliding member according to claim 1, wherein the recess comprises a hole or groove, the depth of the hole or groove being shallower than that of the adjacent hole or groove on the end side in the axial direction of the sliding surface.

3. A sliding member according to claim 1, wherein the recess comprises a hole or a groove of which the depth is 1 to 100 μm.

4. A sliding member according to claim 1, wherein the recess comprises a hole or a groove, and wherein solid lubricant is accommodated in at least one of the holes or grooves.

5. A sliding member for supporting a shaft comprising:
   a sliding surface; and
   a plurality of recesses provided in an end portion in an axial direction on the sliding surface, the recesses being arranged in said end portion so that the total opening area per unit area gradually increases from the center side toward the end side in the axial direction of the sliding surface,
   wherein the recess comprises a hole of which the mean diameter is smaller than that of a hole closer to the end side of the sliding surface.

6. A sliding member according to claim 5, wherein the recess comprises a hole, the depth of the hole being shallower than that of the adjacent hole on the end side in the axial direction of the sliding surface.

7. A sliding member according to claim 5, wherein the recess comprises a hole of which the depth is 1 to 100 μm.

8. A sliding member according to claim 5, wherein the recess comprises a hole, and wherein solid lubricant is accommodated in at least one of the holes.

9. A sliding member for supporting a shaft comprising:
   a sliding surface; and
   a plurality of recesses provided in an end portion in an axial direction on the sliding surface, the recesses being arranged in said end portion so that the total opening area per unit area gradually increases from the center side toward the end side in the axial direction of the sliding surface,
   wherein the recess comprises a hole of which the mean diameter is between 1 and 100 μm.

10. A sliding member according to claim 9, wherein the recess comprises a hole, the depth of the hole being shallower than that of the adjacent hole on the end side in the axial direction of the sliding surface.

11. A sliding member according to claim 9, wherein the recess comprises a hole of which the depth is 1 to 100 μm.

12. A sliding member according to claim 9, wherein the recess comprises a hole, and wherein solid lubricant is accommodated in at least one of the holes.

* * * * *